(12) United States Patent
Sheasley et al.

(10) Patent No.: US 8,702,889 B2
(45) Date of Patent: Apr. 22, 2014

(54) METHOD OF FORMING A TOUGHENED ADHESIVE MATERIAL

(75) Inventors: David Sheasley, Rochester, MI (US); Christopher Hable, Romeo, MI (US); Renee Bradley, St. Clair, MI (US)

(73) Assignee: Zephyros, Inc., Romeo, MI (US)

( * ) Notice: Subject to any disclaimer, the term of this patent is extended or adjusted under 35 U.S.C. 154(b) by 863 days.

(21) Appl. No.: 12/136,333

(22) Filed: Jun. 10, 2008

(65) Prior Publication Data

US 2008/0308212 A1    Dec. 18, 2008

Related U.S. Application Data

(60) Provisional application No. 60/943,403, filed on Jun. 12, 2007, provisional application No. 60/948,765, filed on Jul. 10, 2007.

(51) Int. Cl.
*B44C 1/165* (2006.01)
*B29C 65/00* (2006.01)
*C04B 37/00* (2006.01)
*C09J 163/00* (2006.01)

(52) U.S. Cl.
USPC .............. 156/230; 156/60; 156/79; 156/293; 156/330; 156/325

(58) Field of Classification Search
USPC ......................................... 156/325, 330, 293
See application file for complete search history.

(56) References Cited

U.S. PATENT DOCUMENTS

| | | | |
|---|---|---|---|
| 3,944,631 A | 3/1976 | Yu et al. | |
| 3,984,497 A | 10/1976 | Owens et al. | |
| 3,985,703 A | 10/1976 | Ferry et al. | |
| 4,034,013 A | 7/1977 | Lane | |
| 4,096,202 A | 6/1978 | Farnham et al. | |
| 4,175,156 A | 11/1979 | Ikins | |
| 4,304,709 A | 12/1981 | Salee | |
| 4,306,040 A | 12/1981 | Baer | |
| 4,495,324 A | 1/1985 | Chacko et al. | |
| 4,536,436 A | 8/1985 | Maeoka et al. | |
| 5,194,502 A | 3/1993 | Saito et al. | |
| 5,212,261 A | 5/1993 | Stierman | |
| 5,240,645 A | 8/1993 | Strecker | |
| 5,275,853 A | 1/1994 | Silvis et al. | |

(Continued)

FOREIGN PATENT DOCUMENTS

| | | |
|---|---|---|
| JP | 56/118816 A | 9/1981 |
| JP | 3/247446 A | 11/1991 |
| WO | 2004/078853 A2 | 9/2004 |

OTHER PUBLICATIONS

Glass, Terry, "New Thermoplastic Adhesive and Barrier Resins", 2000, 1-5.*

(Continued)

*Primary Examiner* — Philip Tucker
*Assistant Examiner* — Alex Efta
(74) *Attorney, Agent, or Firm* — The Dobrusin Law Firm, PC

(57) ABSTRACT

An adhesive material and articles incorporating the same is disclosed. The adhesive material includes at least three of epoxy resin; impact modifier; flexibilizer, blowing agent; curing agent; and filler. The adhesive material is preferably used for structural adhesion but may be used for sealing, baffling or reinforcing an article of manufacture such as an automotive vehicle.

14 Claims, 1 Drawing Sheet

(56) References Cited

U.S. PATENT DOCUMENTS

| | | | |
|---|---|---|---|
| 5,290,857 A * | 3/1994 | Ashida et al. | 525/65 |
| 5,464,924 A | 11/1995 | Silvis et al. | |
| 5,962,093 A | 10/1999 | White et al. | |
| 6,111,013 A | 8/2000 | Simpson et al. | |
| 6,111,015 A * | 8/2000 | Eldin et al. | 525/65 |
| 6,136,732 A | 10/2000 | Patel | |
| 6,811,864 B2 | 11/2004 | Czaplicki et al. | |
| 6,846,559 B2 | 1/2005 | Czaplicki et al. | |
| 6,887,914 B2 | 5/2005 | Czaplicki et al. | |
| 7,125,461 B2 | 10/2006 | Czaplicki et al. | |
| 7,267,738 B2 | 9/2007 | Czaplicki et al. | |
| 2003/0144416 A1 * | 7/2003 | Tarbutton et al. | 525/65 |
| 2004/0076831 A1 | 4/2004 | Hable et al. | |
| 2004/0221953 A1 | 11/2004 | Czaplicki et al. | |
| 2004/0266899 A1 * | 12/2004 | Muenz et al. | 521/135 |
| 2007/0090360 A1 | 4/2007 | Dai et al. | |
| 2008/0029200 A1 | 2/2008 | Sheasley | |
| 2008/0060742 A1 | 3/2008 | Sheasley et al. | |
| 2008/0105992 A1 | 5/2008 | Walker et al. | |
| 2008/0299317 A1 | 12/2008 | Hable | |

OTHER PUBLICATIONS

International Preliminary Report on Patentability for PCT/US2008/066413, dated Mar. 19, 2010.

* cited by examiner

METHOD OF FORMING A TOUGHENED ADHESIVE MATERIAL

CLAIM OF PRIORITY

The present invention claims the benefit of the priority of the filing date of U.S. Provisional Application Ser. No. 60/943,403 filed Jun. 12, 2007 and U.S. Provisional Application Ser. No. 60/948,765 filed Jul. 10, 2007, which are herein incorporated by reference for all purposes.

FIELD OF INVENTION

The present invention relates generally to an adhesive material, formation of the adhesive material, and application of the material to components of articles of manufacture such as automotive vehicles.

BACKGROUND OF THE INVENTION

For many years industry, and particularly the transportation industry has been concerned with the formation of adhesive materials that exhibit desirable properties such as strength, toughness, durability, combinations thereof or the like. While industry has produced a large number of adhesives having such desirable properties, it has been found that adhesives possessing these properties have other properties such as lower viscosities and less dimensional stability, which can make these adhesives difficult to apply due to application equipment requirements, undesirably high flow and/or other factors. Thus, industry has also sought to produce adhesive materials that exhibit desirable properties and are relatively easy to apply. The present invention, therefore, seeks to provide an improved adhesive material that exhibits one or more desirable properties for use in automotive vehicles or other applications and/or is relatively easy to apply.

SUMMARY OF THE INVENTION

In one aspect, the present invention contemplates a method of forming and applying an adhesive material comprising the steps of forming an adhesive material that includes epoxy resin, impact modifier and/or epoxy flexibilizer, and a curing agent; locating the adhesive material upon or adjacent a surface; and activating the adhesive material to bond the adhesive material to the surface.

In another aspect, the present invention contemplates a method of forming and applying an adhesive material comprising the steps of forming an adhesive material that includes about 15% to about 25% by weight epoxy resin, about 10% to about 15% by weight a copolymer having a thermoplastic polyether, at least 13% and less than 40% by weight impact modifier, at least 17% and less than 45% by weight epoxy flexibilizer; and a curing agent; disposing the adhesive material as a part upon a release material; removing the adhesive material from the release material and locating the adhesive material upon or adjacent a first surface of the automotive vehicle; and activating the adhesive material to foam and thermoset the adhesive material such that the adhesive material bonds to the first surface and a second surface of the automotive vehicle.

In another aspect, the present invention contemplates a method of forming and applying an adhesive material comprising the steps of forming an adhesive material that includes about 15% to about 25% by weight epoxy resin, about 10% to about 15% by weight a copolymer, at least 13% and less than 40% by weight a core/shell impact modifier, at least 17% and less than 45% by weight epoxy flexibilizer; and about 2% to about 6% by weight a curing agent; disposing the adhesive material as a part upon a release material; removing the adhesive material from the release material and locating the adhesive material upon or adjacent a first surface of the automotive vehicle; and activating, by heating the adhesive material above 120° C., so as to foam and thermoset the adhesive material such that the adhesive material bonds to the first surface and a second surface of the automotive vehicle.

In yet another aspect, the present invention may be further characterized by one or any combination of the following features: the adhesive material has an impact strength of greater than 15 N/mm at temperatures less than −30° C. using an ISO-11343 Impact Wedge Peel with 0.8 mm thick EG-60 Adherends, the adhesive material has an impact strength of greater than 20 N/mm at temperatures less than −30° C. using an ISO-11343 Impact Wedge Peel with 0.8 mm thick EG-60 Adherends, the adhesive material has an impact strength of greater than 15 N/mm at temperatures of about −00° C. using an ISO-11343 Impact Wedge Peel with 0.8 mm thick EG-60 Adherends, the surface is part of a component of an automotive vehicle, the adhesive material includes both the impact modifier and the epoxy flexibilizer, the impact modifier forms a discrete phase in the adhesive material upon activation of the adhesive material, the activation including curing, at least a portion of the impact modifier has a Tg of less than −30° C., −50° C. or −70° C., the impact modifier includes a core/shell polymer, the epoxy flexibilizer is an epoxy or amine modified polymer, the epoxy flexibilizer is a polyurethane modified epoxy, an epoxidized polysulfide, or a combination of both, the adhesive material further includes about 10% to about 15% by weight a copolymer having a thermoplastic polyether, the thermoplastic polyether is a phenoxy resin having a molecular weight of at least 50,000, the epoxy resin includes a liquid portion and has a viscosity from about 8,000 to about 22,000 cps, an epoxy equivalent weight of about 150 to about 220 g/eq, or both, the copolymer is a phenoxy resin with a molecular weight of at least 50,000, the epoxy flexibilizer is a polyurethane modified epoxy or amine modified polymer, the adhesive material further includes an epoxy/rubber adduct, the adhesive material further includes a curing agent accelerator having a modified diphenyl bis urea, an imidazole, blocked amine, or any combination thereof, the adhesive material further includes a filler, and the adhesive material includes an exterior surface that is substantially tacky and a handling layer that is generally free of tack, and wherein the release material is disposed along at least a portion of the exterior surface.

DETAILED DESCRIPTION

Figure 1:
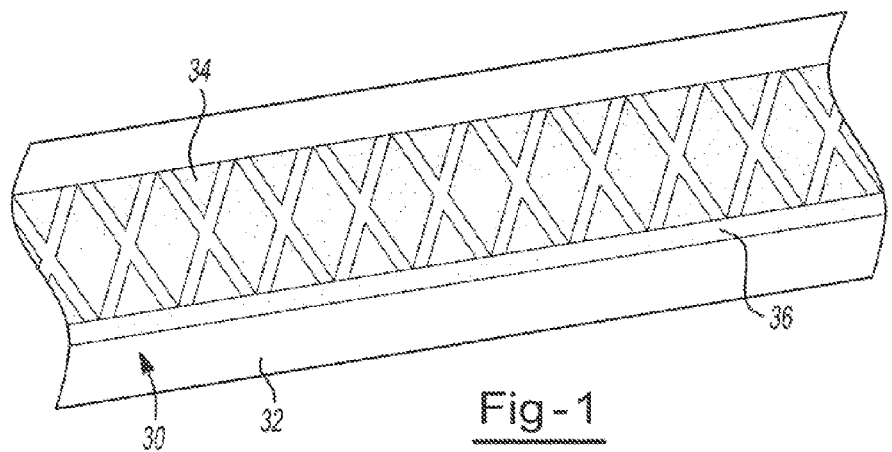
FIG. 1 is a perspective view of an adhesive part that includes an exemplary adhesive material in accordance with an aspect of the present invention.

The present invention is predicated upon provision of an improved adhesive material, and articles incorporating the same. The adhesive material is typically employed for providing structural adhesion to a first surface, a second surface, or both of one or more components of an article of manufacture such as an automotive vehicle. The adhesive material can additionally or alternatively provide structural reinforcement, sealing, baffling, acoustical damping properties or a combination thereof within a cavity of, or upon a surface of a structure, or to one or more structural members (e.g., a body panel or structural member) of an article of manufacture (e.g., an automotive vehicle). Preferably, the adhesive material is an activatable material. As used herein, the phrase activatable material includes any material that may be activated to melt, flow, cure (e.g., thermoset), expand, foam or a combination thereof by an ambient condition or another condition. For example, the material may expand, foam, flow, melt, cure, a combination thereof or the like upon exposure to a condition such a heat, pressure, chemical exposure, combinations thereof or the like. Preferably, the adhesive material is a latent cure material.

The adhesive material typically includes adhesive polymeric material (e.g., epoxy resin or the like) and one or a combination of flexibilizer (e.g., epoxy flexibilizer), impact modifier, blowing agent, curing agent and filler. The activatable material preferably includes at least three, four or more of the following:
  (a) about 2 to about 70 percent by weight epoxy resin;
  (b) about 2 to about 80 percent by weight flexibilizer;
  (c) one or more additional polymers and/or copolymers, which can include a one or more phenoxy resins;
  (d) about 2 to about 70 percent by weight impact modifier;
  (e) up to about 5 parts by weight blowing agent;
  (f) about 0.3 to about 7 parts by weight curing agent; and
  (g) filler.

The concentrations may be higher or lower depending upon the intended application of the adhesive material. In a preferred aspect of the invention, the adhesive material includes one or more impact modifiers that form a relatively low $T_g$ (glass transition temperature) discrete secondary phase within the adhesive material. As used herein, the term discrete secondary phase is used to denote a portion of the adhesive material that separates itself from the rest of the adhesive material prior to, during, and/or after cure of the adhesive material.

The adhesive material of the present invention may be applied to various articles of manufacture for adhering (e.g., structurally adhering) a first surface of one, two or more components (e.g., members) to a second surface of the one, two or more components. Such adhesion can provide structural integrity and/or adhesion to components of articles but may also provide sealing, damping, reinforcement or the like to the component of the articles. Examples of such articles of manufacture include, without limitation, household, or industrial appliances, furniture, storage containers, buildings, structures, or the like. In preferred embodiments, the adhesive material is applied to components of an automotive vehicle such as body or frame members (e.g., a vehicle frame rail) of the automotive vehicle. One method of the present invention contemplates applying the adhesive material to one or more surfaces of one of the above components or article in a pre-activated state (e.g., a tacky state) and activating the material for curing, thermosetting, expanding and/or foaming the material. Upon activation, the adhesive material typically wets the surfaces that the material contacts to adhere and bonds to those surface (e.g., through curing and/or thermosetting). If the adhesive material is expandable or foamable, the material will typically expand to a volume greater than its volume in the unexpanded state (e.g., at least 5% greater, at least 20% greater or even possibly at least 50% greater). It is also typically preferred, at least for structural adhesion, that the volumetric expansion be relatively low such that the expanded volume is less than 400%, more typically less than 300%, even more typically less than 200% relative to the original unexpanded volume. The expansion levels are considered exemplary and greater or lesser expansion levels can be within the scope of the present invention unless otherwise specifically stated. Moreover, it is also contemplated that the volume of the material may be less after activation due to curing (e.g., cross-linking) for foamed or unfoamed versions of the activatable material.

Percentages herein refer to weight percent, unless otherwise indicated.

Epoxy Resin

Epoxy resin is used herein to mean any of the conventional epoxy materials containing at least one epoxy functional group. The epoxy resins can be difunctional, trifunctional, multifunctional, combinations thereof or otherwise. Moreover, the term epoxy resin can be used to denote one epoxy resin or a combination of multiple epoxy resins. The polymer-based materials may be epoxy-containing materials having one or more oxirane rings polymerizable by a ring opening reaction. In preferred embodiments, the adhesive material includes up to about 80% or more of an epoxy resin. More preferably, the adhesive material includes between about 2% and 70% by weight epoxy resin, more preferably between about 7% and 50% by weight epoxy resin and even more preferably between about 15% and 40% by weight epoxy resin and even possibly between about 15% and about 25% by weight epoxy resin. Of course, amounts of epoxy resin may be greater or lower depending upon the intended application of the adhesive material. As an example, it is contemplated that weight percentages may be lower or higher when other ingredients such as the impact modifier, flexibilizer, filler, alternative polymers, combinations thereof, or the like are used in greater or lesser weight percentages.

The epoxy may be aliphatic, cycloaliphatic, aromatic, or the like. The epoxy may be supplied as a solid (e.g., as pellets, chunks, pieces or the like) or a liquid (e.g., an epoxy resin) or both. As used herein, unless otherwise stated, a resin is a solid resin if it is solid at a temperature of 23° C. and is a liquid resin if it a liquid at 23° C. Preferably, an epoxy resin is added to the adhesive material to increase the adhesion, flow properties, or both of the material. One exemplary epoxy resin may be a phenolic resin, which may be a novalac type or other type resin. For example, bisphenol A resin, bisphenol F resin, a combination thereof or the like may be employed. Moreover, various mixtures of several different epoxy resins may be employed as well. Examples of suitable epoxy resins are sold under the tradename DER® (e.g., DER 331, DER 661, DER 662), commercially available from the Dow Chemical Company, Midland, Mich.

In one preferred embodiment, the epoxy resin is comprised of at least 50%, more typically at least 70% and even possibly at least 90% (e.g., substantially entirely or entirely) by weight thereof of liquid epoxy resin (e.g., a resin that has a molecular weight such that it is liquid at 23° C.). Such liquid epoxy resin typically has a viscosity at a temperature of 23° C. of at least 5000, more typically at least 8000 and even possibly at least 11,000 cps, but typically less than 30,000, more typically less than 22,000 and even possibly less than 15,000 cps, although higher and lower values may also be possible unless otherwise stated. The liquid epoxy resin typically has an epoxy equivalent weight of at least 80, more typically at least 150 and even possibly at least 185 g/eq, but typically less than 300, more typically less than 220 and even possibly less than 195 g/eq, although higher and lower values may also be possible unless otherwise stated. Preferred liquid resins include diglycidyl ethers that may be aromatic phenol based (bisphenol A or F) and are sold under the tradename DER 331, commercially available from the Dow Chemical Company and EPON 828 and EPON 863, commercially available from Hexion Specialty Chemicals.

Flexibilizer

When used, the flexibilizer can be provided as a single flexibilizer or as a combination of multiple different flexibilizers. Although other flexibilizers may be employed, preferred flexibilizers include polymers that are amine modified, epoxy modified, or both. These polymers can include thermoplastics, thermosets or thermosettables, elastomers, combinations thereof or the like. These polymers may be modified with aromatic or non-aromatic epoxy and/or may be modified with bisphenol-F type, bisphenol-A type, combinations thereof or other type epoxy. Examples of preferred flexibilizer are epoxidized polysulfides sold under the tradenames EPS-350 and EPS-80, commercially available from Akzo-Nobel. An example of another preferred flexibilizer is an epoxy-dimer acid elastomer sold under the tradenames HYPOX DA 323, commercially available from CVC Specialty Chemicals. An example of another preferred flexibilizer is a polyurethane modified epoxy sold under the tradenames GME-3210 and GME-3220, commercially available from GNS Technologies. Without being bound by theory, it is believed that when a polyurethane modified epoxy flexibilizer is included; the adhesive material may substantially maintain impact strength (e.g., impact resistance) at low temperatures, while minimizing the reduction of Tg (e.g., as compared to other flexibilizers). Yet further examples of preferred flexibilizer are amine or epoxy terminated polyethers such as JEFFAMINE D-2000, commercially available from Huntsman and DER® 732, commercially available from the Dow Chemical Company. All of the individual flexibilizers discussed herein may be used separately or in combination with each other in the adhesive material of the present invention, unless otherwise stated.

When present, the flexibilizer is typically a substantial portion of the overall adhesive material. Typically, the flexibilizer is at least 5%, more typically at least 17% and even possibly at least 25% by weight of the adhesive material but is typically less than 60%, more typically less than 45% and even possibly less than 35% by weight of the adhesive material, although higher and lower values may also be possible unless otherwise stated. It is also contemplated in particular that the amount of flexibilizing agent may be higher in embodiments where the agent is modified with an epoxy component.

Impact Modifier

Generally, it is preferable for the adhesive material to include at least one impact modifier. It is generally preferable for the impact modifier to be at least 4%, more typically at least 7%, even more typically at least 10%, still more typically at least 13% and even still more typically at least 20% by weight of the adhesive material and also preferable for the impact modifier to be less than 70%, more typically less than 40% an even more typically less than 30% by weight of the adhesive material, although higher or lower amounts may be used in particular embodiments.

As used herein, like with any other ingredients of the present invention, the term "impact modifier" can include one impact modifier or plural impact modifiers. The impact modifier can include thermoplastics, thermosets or thermosettables, elastomers, combinations thereof or the like. In a preferred embodiment the impact modifier includes elastomer (including elastomer containing materials), a core/shell polymer (which may include elastomer), or a combination thereof.

When included, the impact modifier can include variable amounts of core/shell polymer, unless otherwise stated. However, in one preferred embodiment of the present invention, the impact modifier includes a substantial portion of core/shell impact modifier. In one preferred embodiment, the impact modifier is compromised of at least 60%, more typically at least 80% and even possibly at least 97% core/shell polymer or impact modifier. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems.

The first and second polymeric materials of the core/shell impact modifier can include elastomers, polymers, thermoplastics, copolymers, other components, combinations thereof or the like. In preferred embodiments, the first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes, or the like.

Preferred core/shell impact modifiers are formed by emulsion polymerization followed by coagulation or spray drying. In certain applications, coagulated grades of core/shell impact modifiers have been found particularly desirable for promoting adhesion to surfaces having impurities thereon such as dirt, oil (e.g., metal stamping oil) or the like. Such impact modifiers can cause adhesive failure to be less likely (as opposed to cohesive failure) for adhesives having formulations such as those described herein for clean surfaces and/or for surface with impurities thereon. It is also preferred for the impact modifier to be formed of, or at least include a core-shell graft co-polymer.

Examples of useful core-shell graft copolymers are those where hard containing compounds, such as styrene, acrylonitrile or methyl methacrylate, are grafted onto core made from polymers of soft or elastomeric containing compounds such as butadiene or butyl acrylate. U.S. Pat. No. 3,985,703, which is herein incorporated by reference for all purposes, describes useful core-shell polymers, the cores of which are made from butyl acrylate but can be based on ethyl isobutyl, 2-ethylhexel or other alkyl acrylates or mixtures thereof. The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl methacrylate and optionally other alkyl methacrylates, such as ethyl, butyl, or mixtures thereof methacrylates. Up to 40 percent by weight or more of the shell monomers may be styrene, vinyl acetate, vinyl chloride, and the like. Additional core-shell graft copolymers useful in embodiments of the present invention are described in U.S. Pat. Nos. 3,984,497; 4,096,202; 4,034,013; 3,944,631; 4,306,040; 4,495,324; 4,304,709; and 4,536,436, the entireties of which are herein incorporated by reference. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

One preferred impact modifier is a core/shell polymer includes a shell of polymethyl methacrylate (PMMA) or acrylonitrile polymer or copolymer and a core of butadiene or styrene butadiene material. Examples of useful impact modifiers include, but are not limited to those sold under the tradename, PARALOID, commercially available from Rohm & Haas Co. Preferred grades of PARALOID are sold under the designations EXL-2691A or EXL-2650A. Another preferred grade is sold under the tradename CLEAR-STRENGTH E-950, commercially available from Arkema.

Other preferred core/shell impact modifiers include those with a relatively soft acrylate core (e.g., polybutyl acrylated or other low Tg acrlyate) and a hard acrylate shell (e.g., PMMA). Preferred grades of these type of impact modifiers are sold under the tradename DURASTRENGTH D-440 commercially available from Arkema and Paraloid EXL-2300 and 2314 commercially available from Rohm and Haas.

Additional or alternative impact modifier may be provided as particulate (e.g., ground or pulverized) elastomer or rubber or adduct thereof (e.g., carboxy terminated butadiene acrylonitrile rubber or adduct thereof). Such modifier will typically have a relatively low Tg as discussed below. Examples of desirable impact modifiers of this type include HYPOX RK 8-4, commercially available from CVC specialty chemicals or Araldite ES 1522, commercially available from Huntsman Chemical. Particularly preferred are solid epoxy adducts of a carboxylated, solid, high molecular weight nitrile rubber. It may also be desirable to include another nitrile rubber such as a hydrogenated butadiene nitrile rubber as part of the whole of the impact modifier.

In one aspect of the present invention, it can be desirable for a portion or the entirety of the impact modifier to form a discrete secondary phase in the adhesive material, although not required unless otherwise stated. Thus, in one embodiment, at least 30%, more typically at least 60% and even possibly at least 90% or the entirely of the impact modifier, by weight, has a relatively low Tg and preferably forms a discrete secondary phase in the adhesive material prior to, during or after cure. Preferably, the relatively low Tg is below −20° C., more typically below −50° C. and even possibly below −70° C. For any core/shell polymer, the core, the shell, or both can have the relatively low Tg. In a preferred embodiment, however, the core can have a relatively low Tg while the shell may have a higher Tg and potentially be compatible with the rest of the adhesive material (i.e., the portion of the adhesive material that is not part of the secondary phase) and even potentially be reactive with at least a portion of the rest of the adhesive material.

Curing Agent

One or more curing agents and/or curing agent accelerators may be added to the adhesive material. Amounts of curing agents and curing agent accelerators can vary. Exemplary ranges for the curing agents or curing agent accelerators present in the adhesive material range from about 0.001% by weight to about 9% by weight and more typically from about 2% to about 6% by weight.

Preferably, the curing agents assist the adhesive material in curing by crosslinking of the polymers, epoxy resins, other ingredients in the material or a combination thereof. It is also preferable for the curing agents to assist in thermosetting the activatable material. Useful classes of curing agents include agents that cross-link the epoxy resin and/or other ingredients by addition reaction or catalyzed reaction. The curing agent materials can be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), dihydrazides, sulfonamides, diamino diphenyl solfone, anhydrides, mercaptans, imidazoles, ureas, tertiary amines, BF3 complexes or mixtures thereof. Particular preferred curing agents include modified and unmodified polyamines or polyamides such as triethylenetetramine, diethylenetriamine tetraethylenepentamine, cyanoguanidine, dicyandiamides and the like.

The curing agents may be activated by mixing with the other ingredients of the adhesive material or by exposure to a condition such a radiation, moisture, pressure or the like. In a preferred embodiment, the curing agent is latent and heat activated.

An accelerator for the curing agents (e.g., a modified or unmodified urea such as methylene diphenyl bis urea, an imidazole, blocked amine or a combination thereof) may also be provided for preparing the adhesive material.

Blowing Agent

One or more blowing agents may be added to the adhesive material for producing inert gasses that form, as desired, an open and/or closed cellular structure within the activatable material. In this manner, it may be possible to lower the density of articles fabricated from the material. In addition, the material expansion can help to improve adhesion, sealing capability, acoustic damping, or both. Of course, the adhesive material may also be without or substantially without (e.g., less than 0.17 by weight) any blowing agent. Amounts of blowing agents and blowing agent accelerators can vary widely within the adhesive material depending upon the type of cellular structure desired, the desired amount of expansion of the adhesive material, the desired rate of expansion and the like. Exemplary ranges for the amounts of blowing agents and blowing agent accelerators in the activatable material range from about 0.001% by weight to about 5% by weight and are preferably in the adhesive material in fractions of weight percentages. In a preferred embodiment, the adhesive material exhibits relatively low or no expansion and/or foaming. In such an embodiment, the amount of blowing agent is typically less than 2%, more typically less than 1% and even more typically less than 0.5% by weight of the adhesive material.

The blowing agent, particularly when a chemical blowing agent is employed, may include one or more nitrogen containing groups such as amides, amines, and the like. Examples of suitable blowing agents include dinitrosopentamethylenetetramine, azodicarbonamide, dinitrosopentamethylenetetramine, 4,4$_i$-oxy-bis-(benzenesulphonylhydrazide), trihydrazinotriazine and N,N$_i$-dimethyl-N,N$_i$-dinitrosoterephthalamide.

Physical blowing agents may additionally or alternatively be employed. As one example, solvent filled polymeric shells that soften and expand upon exposure to heat may be used.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include organic bases such as urea and organic acids such as adipic or benzoic acid. Zinc benzene sulfinate may also be a desirable accelerator.

Polymer or Copolymer

The adhesive material will typically include one or more additional polymers (e.g., copolymers), which can include a variety of different polymers, such as thermoplastics, elastomers, thermosets, thermosettables combinations thereof or the like. For example, and without limitation, polymers that might be appropriately incorporated into the adhesive material include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

When used, these polymers can comprises a small portion or a more substantial portion of the adhesive material (e.g., up to 85% by weight or greater). Preferably, when used, the one or more additional polymers comprises about 0.1% to about 50%, more preferably about 1% to about 20% and even more preferably about 5% to about 15% by weight of the adhesive material.

In certain preferred embodiments, it is desirable to include one or more thermoplastic polyethers and/or thermoplastic epoxy resins in the adhesive material. Such material can assist in providing dimensional stability (e.g., reduce cold flow) to the adhesive material. When included, the one or more thermoplastic polyethers preferably comprise between about 1% and about 90% by weight of the adhesive material, more preferably between about 3% and about 40% by weight of the adhesive material and even more preferably between about 10% and about 15% by weight of the adhesive material. As with the other materials, however, more or less thermoplastic polyether may be employed depending upon the intended use of the adhesive material.

The thermoplastic polyethers typically include pendant hydroxyl moieties. Particularly desirable thermoplastic polyethers are phenoxy resins. As used herein, phenoxy resin is a polyhydroxyether, with ether linkages along the polymer backbone and pendant hydroxyl groups. An exemplary phenoxy resin useful in the current invention is the reaction product of a phenol based difunctional epoxy resin and a difunctional phenol (for example the reaction product of bisphenol A epoxy with bisphenol A). A similar material may also be synthesized directly from a bisphenol (for example bisphenol A) and epichlorohydrin. The terminal epoxy group may be ring opened to generate a terminal alpha glycol group. Phenoxy resins useful in the invention have weight-average molecular weights of at least about 5,000, more typically at least about 25,000 and still more typically at least about 50,000 but less than about 100,000, more typically less than about 75,000 and still more typically less than about 60,000, although greater or lower weights are possible unless otherwise stated. Exemplary grades of phenoxy resin useful in the invention include PAPHEN Phenoxy Resin PKHH and PKHJ commercially available from Inchem Corp., Rockhill, S.C.

Other possible thermoplastic polyethers can include aromatic ether/amine repeating units in their backbones. Other exemplary thermoplastic polyethers include, without limitation, polyetheramines, poly(amino ethers), copolymers of monoethanolamine and diglycidyl ether, combinations thereof or the like. Examples of additional thermoplastic polyethers and their methods of formation are disclosed in U.S. Pat. Nos. 5,275,853; 5,464924 and 5,962,093, which are incorporated herein by reference for all purposes.

Advantageously, the thermoplastic polyethers can provide the adhesive material with various desirable characteristics such as desirable physical and chemical properties for a wide variety of applications as is further described herein.

Although not required, it may be desired for the adhesive material to include one or more ethylene polymers or copolymers such as ethylene acrylates, ethylene acetates, or the like. Ethylene methacrylate and ethylene vinyl acetate are two preferred ethylene copolymers.

Filler and Other Components and Additives

The adhesive material may also include one or more fillers, including but not limited to particulated materials (e.g., powder), beads, microspheres, or the like. Preferably the filler includes a material that is generally non-reactive with the other components present in the adhesive material. While the fillers may generally be present within the adhesive material to take up space at a relatively low weight, it is contemplated that the fillers may also impart properties such as strength, dimensional stability, and impact resistance to the activatable material.

Examples of fillers include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Examples of suitable fillers include, without limitation, wollastonite, talc, vermiculite, pyrophyllite, sauconite, saponite, nontronite, montmorillonite, or mixtures thereof. Clays usable for the adhesive material may be calcined or uncalcined. Clays that may be used as fillers may include clays from the kaolinite, illite, chloritem, smecitite or sepiolite groups, which may be calcined. The clays may also include minor amounts of other ingredients such as carbonates, feldspars, micas and quartz.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers in the adhesive material can range from 2% or less to 70% or greater by weight of the adhesive material, but more typical from about 8 to 40% by weight of the adhesive material. According to some embodiments, the adhesive material may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

It is contemplated that most nearly any additional chemicals, materials or otherwise may be added to the adhesive material assuming they are suitable for the adhesive material and suitable for a chosen application of the adhesive material.

Other additives, agents or performance modifiers may also be included in the adhesive material as desired, including but not limited to a UV resistant agent, a flame retardant, a heat stabilizer, a colorant, a processing aid, a lubricant, a reinforcement/filler (e.g., chopped or continuous glass, ceramic, aramid, or carbon fiber, particulates or the like).

An adhesion promoter can be desirable for certain embodiments. Although, many adhesion promoters may be used, amine or epoxy functional molecules such as amine or epoxy functional silanes have been found to be particularly desirable. One exemplary adhesion promoter is a glycidoxypropyl trimethoxy silane sold under the tradename Z-6040, commercially available from Dow Corning.

When determining ingredients for the adhesive material, it may be important to form the material such that it will only activate (e.g., flow, foam or otherwise change states) at appropriate times or temperatures. For instance, in some applications, it is undesirable for the material to be reactive at room temperature or otherwise at the ambient temperature in a production environment. More typically, the activatable material becomes activated to flow at higher processing temperatures. As an example, temperatures such as those encountered in an automobile assembly plant may be appropriate, especially when the activatable material is processed along with the other components at elevated temperatures or at higher applied energy levels, e.g., during painting preparation steps. Temperatures encountered in many coating operations (e.g., in a paint and/or e-coat curing oven, dry operations or the like), for instance, range up to about 250° C. or higher.

Formation and Application of the Adhesive Material

Formation of the adhesive material can be accomplished according to a variety of new or known techniques. Preferably, the adhesive material is formed as a material of substantially mixed and or homogeneous composition prior to activation thereof. However, it is contemplated that various combining techniques may be used to increase or decrease the concentration of certain components in certain locations of the activatable material.

According to one embodiment, the adhesive material is formed by supplying the components of the material in solid form such as pellets, chunks and the like, in liquid form or a combination thereof. The components are typically combined in one or more containers such as large bins or other containers. Preferably, the containers can be used to intermix the components by rotating or otherwise moving the container. Thereafter, heat, pressure or a combination thereof may be applied to soften or liquidize the components such that the components can be intermixed by stirring or otherwise into a substantially mixed or homogenous composition.

According to another embodiment, the adhesive material may be formed by heating one or more of the components that are generally easier to soften or liquidize such as the polymer based materials to induce those components into a mixable state. Thereafter, the remaining components may then be intermixed with the softened components.

It is also contemplated for any of these embodiments that the material can be provided individually, as admixtures or combinations thereof to an extruder. The extruder then mixes the materials to form the adhesive materials. Even further, it is contemplated that the adhesive material may be fully mixed and formed and then fed to an extruder for dispensing as discussed further below.

Depending upon the components used, it may be important to assure that the temperature of the components remains below certain activation temperatures that might cause the adhesive material to activate (e.g., form gasses, flow, cure or otherwise activate). Notably, when the adhesive material contains a blowing agent, it is typically desirable to maintain the temperature of the adhesive material below a temperature that will activate the blowing agent, curing agent, or both during formation of the adhesive material or before the adhesive material is applied to a surface. In situations where it is desirable to maintain the adhesive material at lower temperatures it may be desirable to maintain the components in a semi-solid or viscoelastic state using pressure or a combination of pressure and heat to intermix the components of the adhesive material. Various machines such as extruders, or otherwise have been designed to applying heat, pressure or both to materials.

After formation of the adhesive material, the material is typically applied to a surface or substrate and activated. Activation of the material may include at least some degree of foaming or bubbling in situations where the activatable material includes a blowing agent. Such foaming or bubbling can assist the activatable material in wetting a substrate and forming an intimate bond with the substrate. Alternatively, however, it shall be recognized that the activatable material may be activated to soften and/or flow without foaming or bubbling and may still substantially wet the substrate to form an intimate bond. Formation of the intimate bond will typically but not necessarily occur upon curing of the adhesive material.

It shall be understood that, depending upon its the intended application, the adhesive material may be applied and activated in different ways and at different times. Thus, exemplary uses of the adhesive material are discussed below to illustrate preferred methodologies of application and activation of the adhesive material. In particular, the adhesive material may used for, amongst others, reinforcement, sealing and adhering, acoustic baffling or the like. Example of potential uses for the adhesive material are disclosed in U.S. Pat. No. 7,125,461 and U.S. patent application Ser. No. 11/757,499, both of which are incorporated. The adhesive material has been found particularly useful as a structural adhesive material.

Structural Adhesive

Figure 2:
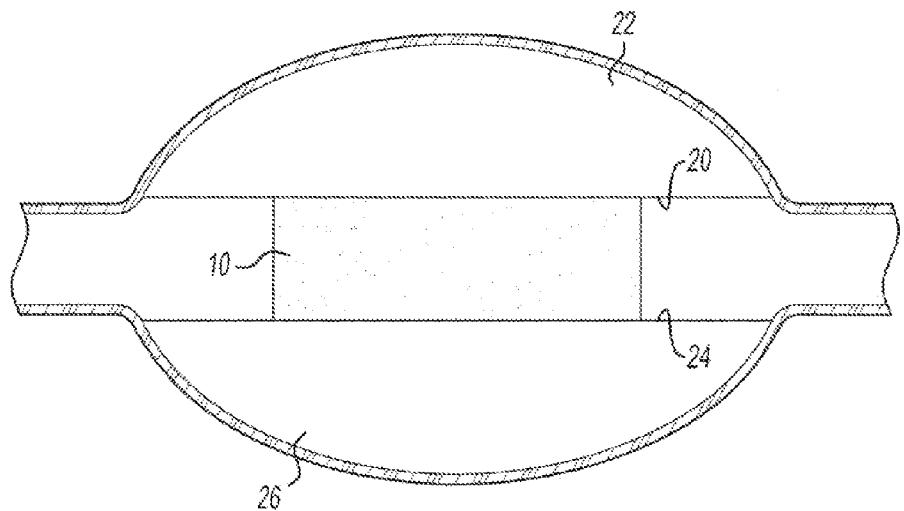
FIG. 2 is a sectional view of an exemplary adhesive material adhered to substrates according to an aspect of the present invention.

As a structural adhesive, and with reference to FIG. 2, the adhesive material 10 is typically put in contact with at least an attachment surface 20 of a first substrate 22 also, typically and an attachment surface 24 of a second substrate 26. Such contacting may occur prior to activation of the adhesive material, during activation of the adhesive material or a combination thereof. For example, the adhesive may be contacted with one of the surfaces and then activated to flow, expand or both to contact the other surface. As another example, the adhesive material may be contacted and pressed between the surfaces and subsequently activated. It should also be recognized that the surfaces 20, 24, substrates 22, 26 or both may be part of single component or member or two or more components or members that are attached to each other by the adhesive material and optional additional attachments.

In one embodiment, the surfaces 20, 24 and substrates 22, 26 are part of components of an automotive vehicle. In such an embodiment, the adhesive material is typically activated at an elevated temperature in an automotive coating drying operation (e.g., at temperatures common to e-coat or automotive painting operations (temperatures typically above 120 or 150° C.)) to adhere to the surfaces 20, 24. Contact with attachment surface of the first member and the second member may occur prior to or during activation and curing of the material. Examples of structural adhesive applications are disclosed in U.S. patent application Ser. Nos. 10/234,902; 10/386,287; 60/451,811, all of which are incorporated herein by reference for all purposes.

The adhesive material of the present invention may be applied to a surface manually or automatically (e.g., through direct extrusion onto a surface). In a preferred embodiment, the adhesive material is applied as a preformed part. In such an embodiment, the adhesive material is shaped to form an adhesive material part of substantially predetermined dimension, for example by molding or by extrusion and/or cutting. Thereafter, the adhesive material part is then manually applied, automatically applied or a combination thereof to a surface or surfaces. In a preferred embodiment and with reference to FIG. 1, adhesive material parts 30 are disposed upon (e.g., extruded onto) a release material 32 (e.g., release paper) such that they can later be remove and manually applied, automatically applied or a combination thereof to one or more surfaces as already described herein. To aid in application, particularly manual application, of the adhesive material, a handling layer 32 may be applied to the adhesive material 36 since the adhesive material, as a part or otherwise, may be substantially tacky prior to application. The handling layer 34 may be a film, a coating, a powder, a fibrous material, a web, combinations thereof or the like. Examples of suitable handling layers are disclosed in U.S. Pat. No. 6,811,864 and U.S. Patent Application Publication 2004/0076831, both of which are incorporated herein by reference for all purposes. Thus, it is possible that an adhesive material part may be provided with a layer (from less than about 10 microns to about 2 cm (e.g., on the order of less than about 1 mm)) that is generally free of tack for facilitating handling. It is also contemplated that the structural adhesive material, the layer, or both may be formed of the adhesive material of the present invention.

Advantageously, forming the adhesive material into a preformed part can provide advantages. It can avoid the need for bulky and expensive pumping and dispensing equipment. It can provide for easier application of adhesive material in locations where pumpable adhesives are difficult to apply, particularly locations that are hard to reach. The adhesive material parts can be pre-applied to surfaces of components such as metal stampings such that the adhesive material is supplied to an assembly operation PIA (part-in-assembly) (e.g., the adhesive material is supplied to the assembly as the component to which the material has been applied is assembled to the assembly). The adhesive material can also exhibit desirable resistance to "wash off" in, for example, e-coat and/or phosphating operations.

As another advantage, embodiments of the adhesive material are capable of exhibiting desirable properties. For example, embodiments of the adhesive material have shown relatively high impact strengths at room temperature (about 23° C.) or below, at −30° C. or below and even at −40° C. or below as measured by ISO 11343. When samples of the adhesive were tested using ISO11343 Impact Wedge Peel with 0.8 mm thick EG-60 Adherends, the samples, at the temperatures discussed, can exhibit impact wedge peel strengths greater than 15 N/mm, more preferably greater than 20 N/mm, more preferably greater than 25 N/mm, more preferably greater than 30 N/mm, still more preferably greater than 35 N/mm, even more preferably greater than 40 N/mm and even 45 N/mm for bondlines of both 0.2 mm and/or 1.0 mm. For example, the adhesive material has an impact strength of greater than 15 N/mm at temperatures less than −30° C. using an ISO-11343 Impact Wedge Peel with 0.8 mm thick EG-60 Adherends. Furthermore, the samples may exhibit impact wedge strengths of greater than 20 N/mm at temperatures less than −30° C. Still furthermore, the samples may exhibit impact wedge strengths of greater than 15 N/mm at temperatures of about −40° C., or possibly lower. While these strengths are typically desirable for the adhesive material of the present invention, they are not necessarily required unless specifically recited. Embodiments of the material can also exhibit relatively high peel strengths, tensile strengths, compressive strengths, or combinations thereof. Moreover, embodiments of the material have exhibited relatively high degrees of adhesion at −40° C. or lower.

EXAMPLES

Table A is provided showing exemplary formulations A through E of embodiments of adhesive materials according to one or more aspects of the present invention. The numbers provided are weight percents of the individual ingredients in the adhesive material.

TABLE A

|  | A | B | C | D | E |
|---|---|---|---|---|---|
| Diglycidyl Ether of Bisphenol A Liquid (EEW ~187 g/eq) | 30.0 | 37.6 | 30.0 | 30.0 | 14.9 |
| Diglycidyl Ether of Bisphenol A Solid (EEW ~525 g/eq) |  |  |  |  | 15.0 |
| Diglycidyl Ether of Bisphenol A Solid (EEW ~925 g/eq) | 20.0 |  | 20.0 |  |  |
| Butanediol Diglycidyl Ether |  |  |  |  |  |
| Dimer Acid Modified Epoxy |  |  |  |  |  |
| Aromatic Epoxidized Polysulfide |  |  |  |  |  |
| Aliphatic Epoxidized Polysulfide |  |  |  | 15.0 | 15.0 |
| Amine terminated polyether (2000 MW) | 15.0 | 12.0 |  |  |  |
| Epoxidized Polypropylene Glycol (EEW ~320 g/eq) |  |  |  |  | 15.0 |
| MBS Core Shell Impact Modifier | 25.0 | 25.0 | 25.0 |  |  |
| Solid Nitrile Rubber/ Solid Epoxy Adduct |  |  |  | 45.0 | 45.0 |
| Carboxy Terminated Butadiene Solid Epoxy Adduct |  |  |  |  |  |
| Phenoxy Resin |  | 15.4 |  |  |  |
| Calcined Kaolin Clay | 5.0 | 5.0 | 5.0 | 5.0 | 5.1 |
| Dicyandiamide | 4.0 | 4.0 | 4.0 | 4.0 | 4.0 |
| Aromatic Modified Urea Accelerator | 0.9 | 0.9 | 0.9 | 0.9 | 0.9 |
| Aliphatic Modified Urea Accelerator |  |  |  |  |  |
| Glycidoxypropyl trimethoxysilane |  |  |  |  |  |
| Pigment | 0.1 | 0.1 | 0.1 | 0.1 | 0.1 |

Table B is provided showing exemplary formulations F through J of embodiments of adhesive materials according to one or more aspects of the present invention. The numbers provided are weight percents of the individual ingredients in the adhesive material.

TABLE B

|  | F | G | H | I | J |
|---|---|---|---|---|---|
| Diglycidyl Ether of Bisphenol A Liquid (EEW ~187 g/eq) | 18.4 | 25.4 | 19.8 | 19.9 | 31.5 |
| Diglycidyl Ether of Bisphenol A Solid (EEW ~525 g/eq) |  |  |  |  | 20.0 |
| Diglycidyl Ether of Bisphenol A Solid (EEW ~925 g/eq) |  |  |  |  |  |
| Butanediol Diglycidyl Ether | 3.0 |  |  |  |  |
| Dimer Acid Modified Epoxy |  |  | 30.0 | 25.0 |  |
| Aromatic Epoxidized Polysulfide | 30.0 |  |  |  |  |
| Aliphatic Epoxidized Polysulfide |  | 15.0 |  |  |  |
| Amine terminated polyether (2000 MW) |  | 8.0 |  |  | 12.0 |
| Epoxidized Polypropylene Glycol (EEW ~320 g/eq) |  | 3.0 |  |  |  |
| MBS Core Shell Impact Modifier | 25.0 | 25.0 | 20.0 |  | 25.0 |
| Solid Nitrile Rubber/ Solid Epoxy Adduct |  |  |  | 45.0 |  |
| Carboxy Terminated Butadiene Solid Epoxy Adduct |  |  |  | 20.0 |  |
| Phenoxy Resin | 13.3 | 13.3 |  |  |  |
| Aramid Fiber |  |  |  |  | 1.5 |

TABLE B-continued

|  | F | G | H | I | J |
|---|---|---|---|---|---|
| Calcined Kaolin Clay | 5.1 | 5.0 | 5.0 | 5.1 |  |
| Dicyandiamide | 4.0 | 4.0 | 4.0 | 4.0 |  |
| Aromatic Modified Urea Accelerator | 0.9 | 0.9 |  | 0.9 |  |
| Aliphatic Modified Urea Accelerator |  |  | 0.9 |  |  |
| Glycidoxypropyl trimethoxysilane | 0.2 | 0.2 | 0.2 |  |  |
| Pigment | 0.1 | 0.1 | 0.1 | 0.1 |  |

It should be understood that amount of ingredient in tables A and B may be varied by ±5%, ±20%, ±40% of the values listed and that those variances are considered to be ranges of ingredients for the adhesive material of the present invention. For example, a value of 10±20% results in a range of 8 weight percent to 12 weight percent of the adhesive material.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of forming and applying an adhesive material comprising the steps of:
   forming a mixture including:
   i) locating in a container an epoxy resin in an amount of from about 15% to about 40% by weight of the mixture, at least 50% of which is provided as a liquid epoxy, the liquid epoxy having a viscosity of at least 8000 cps at 23° C.;
   ii) locating into the container a plurality of pellets of an impact modifier comprising a methacrylate-butadiene-styrene core/shell polymer in an amount of less than about 30% by weight of the mixture;
   iii) locating into the container an epoxidized polysulfide flexibilizer in an amount of at least 5% to about 45% by weight for maintaining impact strength at low temperatures while minimizing the reduction of glass transition temperature; and
   iv) locating into the container a curing agent;
   v) locating into the container a clay filler,
   wherein, in the step of forming the mixture, the core/shell polymer and at least a portion of the epoxy resin are mixed in solid form prior to the introduction of any liquid components;
   locating the adhesive material upon a first surface; and
   activating the adhesive material to bond the adhesive material to a second surface;
   forming a discrete secondary phase within the adhesive material upon activation, whereby a portion of the adhesive material including the core/shell polymer separates itself from the rest of the adhesive material.

2. A method as in claim 1, wherein the first surface and second surface are part of a component of an automotive vehicle.

3. A method as in claim 1, wherein the impact modifier forms a discrete phase in the adhesive material upon activation of the adhesive material, the activation including curing.

4. A method as in claim 3, wherein at least a portion of the impact modifier has a $T_g$ of less than −50° C.

5. A method as in claim 3, wherein the epoxidized polysulfide flexibilizer is an epoxy or amine modified polymer.

6. A method as in claim 1, wherein the adhesive material further includes about 1% to about 20% by weight one or more copolymers having a thermoplastic polyether.

7. A method as in claim 6, wherein the thermoplastic polyether is a phenoxy resin having a molecular weight of at least 50,000.

8. The method of claim 1, wherein the mixture comprises:
   i) about 15% to about 25% by weight epoxy resin;
   ii) about 1% to about 20% by weight a copolymer having a thermoplastic polyether;
   iii) at least about 13% by weight core/shell polymer;
   iv) at least 5% by weight epoxidized polysulfide flexibilizer.

9. A method as in claim 8 wherein, the impact modifier forms a discrete phase in the adhesive material upon activation of the adhesive material, the activation including curing.

10. A method as in claim 9, wherein at least a portion of the impact modifier has a Tg of less than −50° C.

11. A method as in claim 8, wherein the adhesive material further includes about 1% to about 20% by weight a phenoxy resin having a molecular weight of at least 50,000.

12. The method of claim 1 including disposing the adhesive material as a part upon a release material;
   removing the adhesive material from the release material and locating the adhesive material upon or adjacent the first surface of an automotive vehicle; and
   activating, by heating the adhesive material above 120° C., so as to foam and thermoset the adhesive material such that the adhesive material bonds to the first surface and the second surface of the automotive vehicle.

13. A method as in claim 8, wherein:
   i) the epoxy resin includes a liquid portion and has a viscosity from about 8,000 to about 22,000 cps, an epoxy equivalent weight of about 150 to about 220 g/eq, or both;
   ii) the copolymer is a phenoxy resin with a molecular weight of at least 50,000;
   iii) the adhesive material further includes an epoxy/rubber adduct;
   iv) the adhesive material further includes a curing agent accelerator having a modified diphenyl bis urea, an imidazole, blocked amine, or any combination thereof.

14. A method as in claim 13, wherein the adhesive material includes an exterior surface that is substantially tacky and a handling layer that is generally free of tack, and wherein the release material is disposed along at least a portion of the exterior surface.

* * * * *